N. AUBIN.
Peat Auger.
No. 99,129. Patented Jan'y 25, 1870.
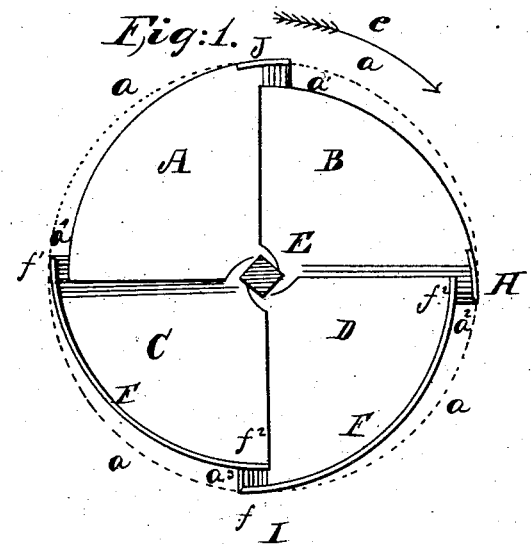
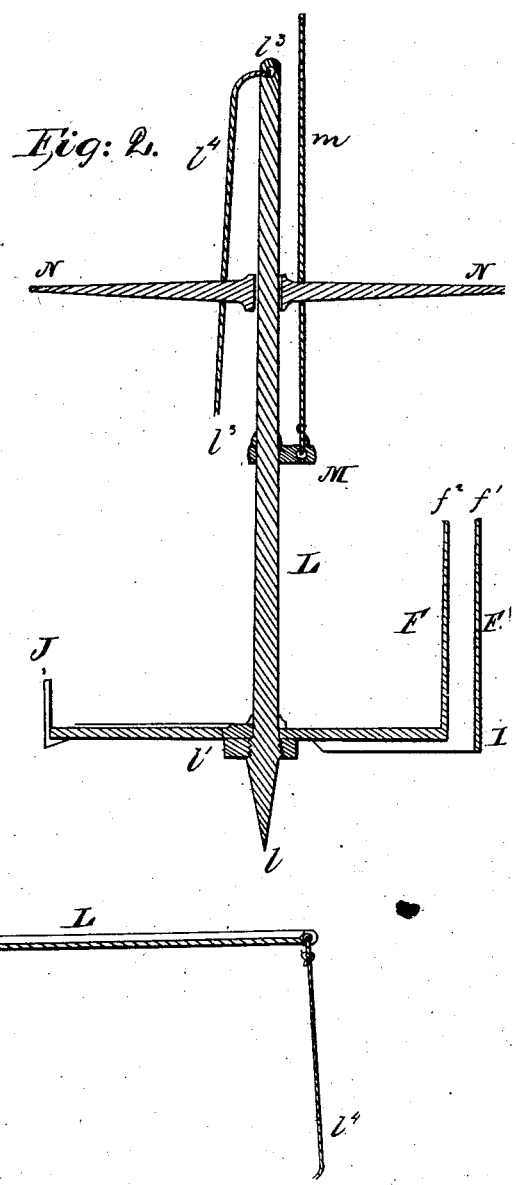
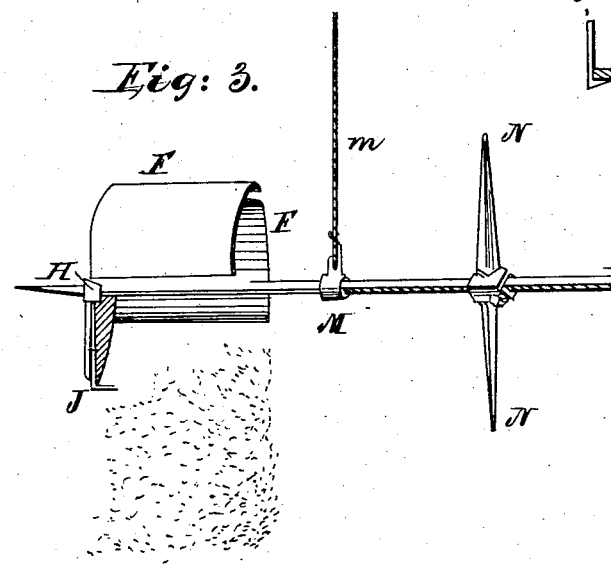
Witnesses:
C. H. Kelles
J.G. Parkinson
Inventor:
N. Aubin

United States Patent Office.

AIME NICHOLAS NAPOLEON AUBIN, OF MONTREAL, CANADA.

Letters Patent No. 99,129, dated January 25, 1870.

IMPROVED PEAT-AUGER.

The Schedule referred to in these Letters Patent and making part of the same.

I, AIME NICHOLAS NAPOLEON AUBIN, formerly of Albany, State of New York, temporarily residing in Montreal, Dominion of Canada, have invented a Submerged-Peat Shovel, of which the following is a specification.

The nature of my invention consists in an implement for extracting peat from the bog, even when it is under water, founded upon the principle of the screw or auger, with a special arrangement for admitting water or air under the instrument when it is being raised with its load, and thus preventing the formation of a vacuum, to overcome which, would require otherwise much power.

Figure 1 is a plan of the screw-blades, two of which bear eccentric enclosing-wings.

Figure 2 is a perpendicular section of the same, from I to J.

Figure 3 shows the position of the shovel when it is raised, canted, and upset to discharge its load.

A B C D are the screw-blades, for cutting into the peat and filling the shovel, by merely revolving it in the direction of the arrow $e$. Their forward edge is lower than their back edge, each thus forming an inclined plane.

E is a square hole, cut into the cross bearing the blades, and in which is inserted the handle.

F F are two upright wings, which together describe nearly one-half of a cylinder.

It will be observed that instead of following the circle indicated by dots at $a\ a\ a\ a$, they are placed eccentrically, so that their forward edge $f^1$ is upon the circle $a$, and their back edge $f^2$ is at a certain distance inside of said circle.

This arrangement has for its object to contract the lump of peat at each revolution of the shovel, so that being smaller than the hole from which it is cut, four vacant spaces, $a^1\ a^2\ a^3\ a^4$, are left around it, through which water or air can penetrate and replace the peat, thus preventing the formation of a vacuum, and therefore facilitating considerably the raising of the load.

These wings are also intended to support the load after it is raised, and the shovel canted to bring it over a scow or the solid surface of the bog.

L, handle of the shovel; it is terminated at its lower extremity by a point, $l$, which sinks into the peat and steadies the shovel when it is being turned by men or machinery.

At $l^3$, threads are cut to receive a nut, which fastens the handle to the blades.

The handle is square where it fits into the hole E; then it is round up to $l^2$, so as to allow the free bracket M to turn and take any position around the handle. Above that the handle is square, in order to fit the cross-arms N, by which the shovel is rotated.

The upper end of the handle is provided with an eye, $l^2$, to which is tied the rope or chain $l^4$, which serves to cant the shovel.

The bracket M has an eye, through which is passed the rope $m$, or chain by which it is hoisted.

P, load of peat falling from the shovel.

J H, cutters.

The operation of my device is simple.

The rope $m$ is passed over a pulley suspended from a movable arm or running hook, and lowered or raised at will, by hand or machinery.

When the shovel is lowered upon the peat in an upright position, men turn it in the direction of the arrow; then it gradually sinks, cutting a circular hole, $a$.

The wings F force the lump to contract as the shovel penetrates into the mass below. When the shovel is full, it is raised by the rope $m$ in an upright position. When above the water, the men take hold of the rope $l^4$ and cant the shovel, with the wings down, so as to support the load. They then swing it over the loading-scow or the shore, and turning it so that the wings are above, the load P falls by its own weight, as seen in fig. 3.

What I claim as my invention, is—

In peat-shovels, the wings F F, constructed as described, and arranged, with relation to the blades A B C D, so as to contract the load, and allow the ingress of air or water to take the place of the extracted material, substantially as hereinbefore set forth.

N. AUBIN.

Witnesses:
C. H. KELLEY,
J. G. PARKINSON.